Aug. 23, 1966    J. N. DORITY    3,267,497
BEE HATCHING DEVICE
Filed Dec. 14, 1964

JOHN N. DORITY
INVENTOR

BY BUCKHORN, BLORE, KLARQUIST & SPARKMAN
ATTORNEYS

United States Patent Office 3,267,497
Patented August 23, 1966

3,267,497
BEE HATCHING DEVICE
John N. Dority, 8 N. 1st, Nyssa, Oreg.
Filed Dec. 14, 1964, Ser. No. 418,044
3 Claims. (Cl. 6—11)

The present invention relates to a bee hatching device and more particularly to a nesting board for a leaf cutter bee.

The so-called leaf cutter bee is an excellent pollenizer of such crops as alfalfa and attempts have been made to propagate such bees for distribution for this work. The leaf cutter bee normally lays its eggs in a small natural opening which is plugged at its entrance with small leaf plugs cut from leaves from which practice the name is given to the bee. It is a principal object of the present invention to provide an artificial hatching device which the bees may utilize to lay their eggs.

The device of the invention comprises a board provided with a plurality of holes therein in which the bees may lay their eggs. While the eggs are in their dormant state the board may be shipped to a new location where it is desired that the bees hatch for their pollenization work. In shipping a bee hatching board across a state line or other boundary, authorities may demand that the board be open for inspection to determine that parasites are not present in the board or that contraband of one type or another is not being secreted in the board. Heretofore, hatching boards have been of single piece of wood and it has been necessary to cut the board open to make such inspection. In accordance with the invention the board is formed of a multiple number of laminae which are releasably secured together and which may be separated to permit inspection of the interior of the board without substantial injury to the eggs or larva which may be present in the openings in the board. The eggs of the leaf cutter bee require a temperature above 70° F. to hatch. To hasten hatching in the spring the board of the invention may be opened so as to enable more rapid heating of the eggs which otherwise are insulated by the board. The laminated structure has further usefulness in permitting the board to be separated to remove dead nests therefrom. Frequently the eggs do not hatch or the larva mature. As long as the leaf plug is in place in an opening the opening will not be reused by the mature bees. However, periodically a board of the invention may be opened to permit the leaf plugs to be removed and the dead eggs and larva to be shaken out whereupon the bees will again use the board to its fullest capacity.

For a more detailed description of the invention reference is made to the accompanying drawings where:

Figures 2, 3:
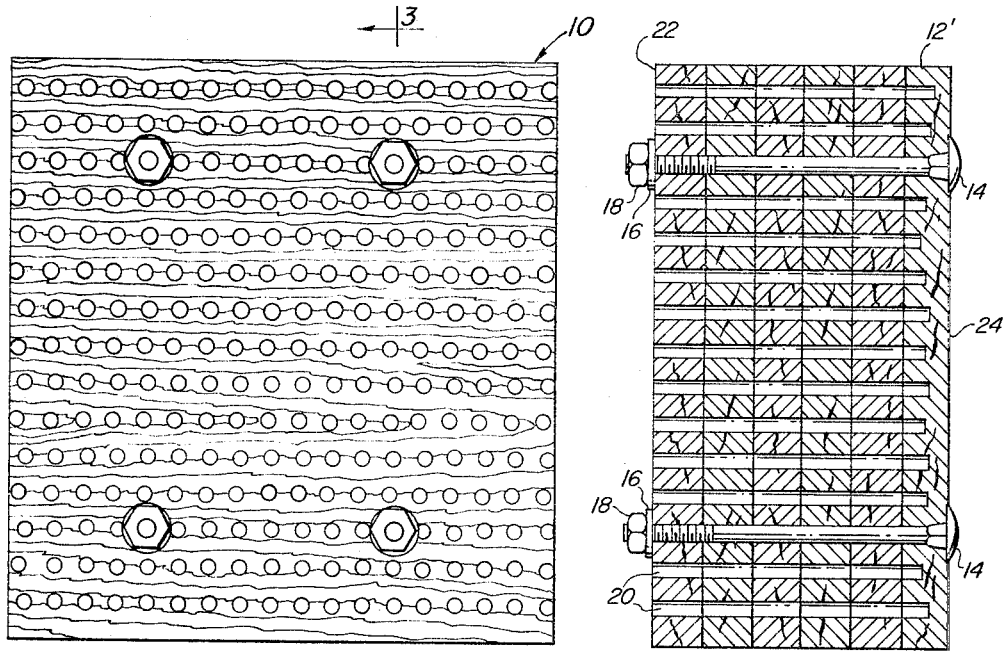
FIG. 2 is an elevation thereof.
FIG. 3 is a sectional view taken substantially along line 3—3 of FIG. 2.

Referring to the drawings, the bee hatching device or board 10 of the invention comprises a plurality of separable, flat faced sections 12 which are releasably secured together by means of bolts 14, washers 16 and nuts 18. As most clearly shown in FIG. 3 the board is provided with a plurality of holes 20 therein all of which open on one face 22 of the board and extend inwardly of the board through all of the laminae except the laminae 12' defining the backface 24 of the board. The holes 20 extend perpendicularly to the surfaces of the laminae as shown. The openings 20 are preferably about 3/16 inch in diameter and about 3 to 3½ inches deep. A board 10, of course, can be any desired length and width. The board sections are preferably formed of wood as indicated but may be of any other suitable material.

Figure 1:
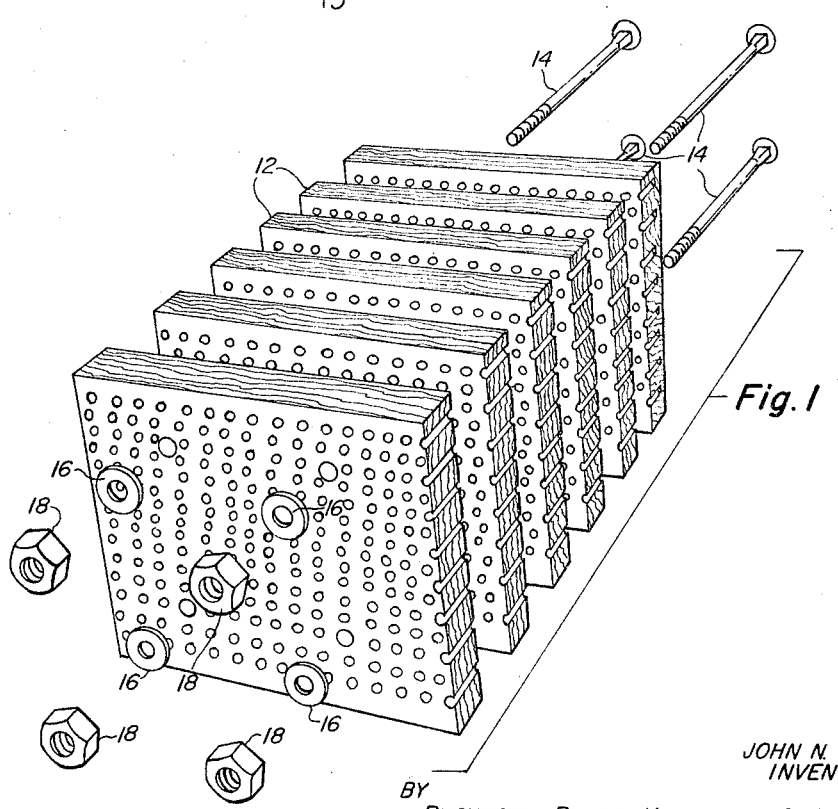
FIG. 1 is an exploded view of a bee hatching board made in accordance with the present invention.

As indicated in FIG. 1 the board may be separated to permit exposure of the eggs to heat or inspection of the interior though, of course, for such purposes separation need not be as great as is shown here. Also, while the board has been shown as comprising six laminations, the board may be formed with more or less laminations which simply permits the board to be dismantled so as to remove the leaf cutter plugs from unhatched holes. The latter arrangement is preferable where boards are not to be shipped where inspection will be required.

Having illustrated and described the preferred embodiment of the invention it should become apparent that the invention permits of modification in arrangement and detail. I claim all such modifications as come within the scope and purview of the appended claims.

I claim:
1. A bee hatching device comprising:
a board having a pair of opposite, flat, parallel faces,
said board being laminated parallel to said faces and comprising a plurality of separable, flat faced sections,
and means releasably securing said sections together,
said board having a plurality of bee-cell sized holes therein extending from one of said faces of said board toward the opposite face thereof, said holes extending perpendicularly to said sections and terminating within the section defining the said opposite face.

2. A bee hatching device comprising:
a board having a pair of opposite, parallel faces,
said board being laminated in a direction parallel to said faces and comprising at least two separable sections,
said board having a plurality of parallel bee-cell sized holes therein extending inwardly from one of said faces of said board entirely through the section defining such face but terminating short of the other of said faces,
and means releasably securing said sections together.

3. A bee hatching device comprising:
a board comprising a plurality of separable, parallel surfaced laminae,
means releasably securing said laminae together,
said board having a plurality of bee-cell sized holes therein extending from one of said parallel surfaces thereof perpendicularly to the surfaces of said laminae and through all of said laminae but the one most remote from said surface whereby said holes open only at said one surface.

References Cited by the Examiner
UNITED STATES PATENTS

| | | | |
|---|---|---|---|
| 2,134,495 | 10/1938 | Woodall et al. | 161—113 |
| 2,726,977 | 12/1955 | See et al. | 161—113 X |
| 3,191,199 | 6/1965 | Barnes | 6—11 |

FOREIGN PATENTS 829,376   1/1952   Germany.

SAMUEL KOREN, Primary Examiner.
LUCIE H. LAUDENSLAGER, Examiner.